Patented Nov. 21, 1939

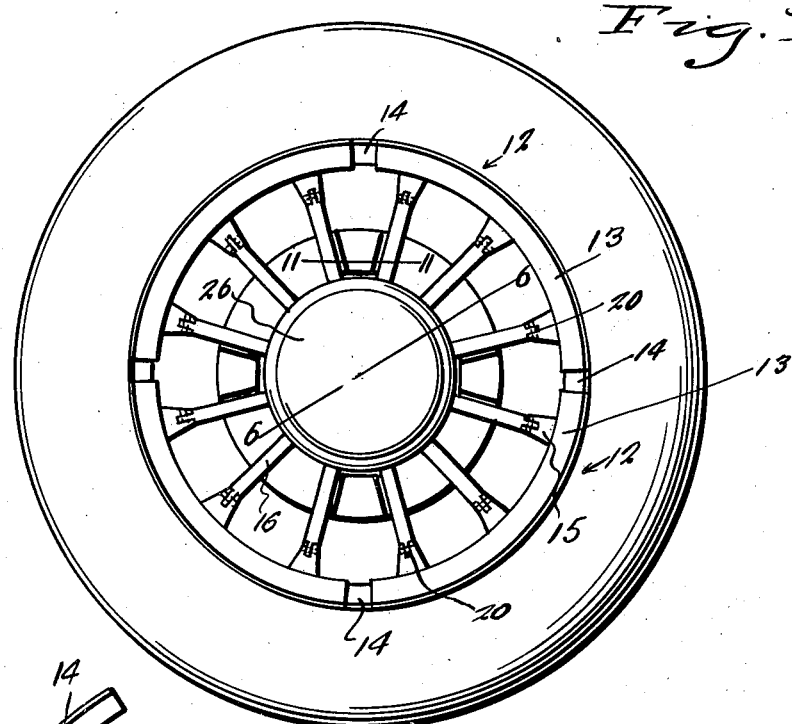

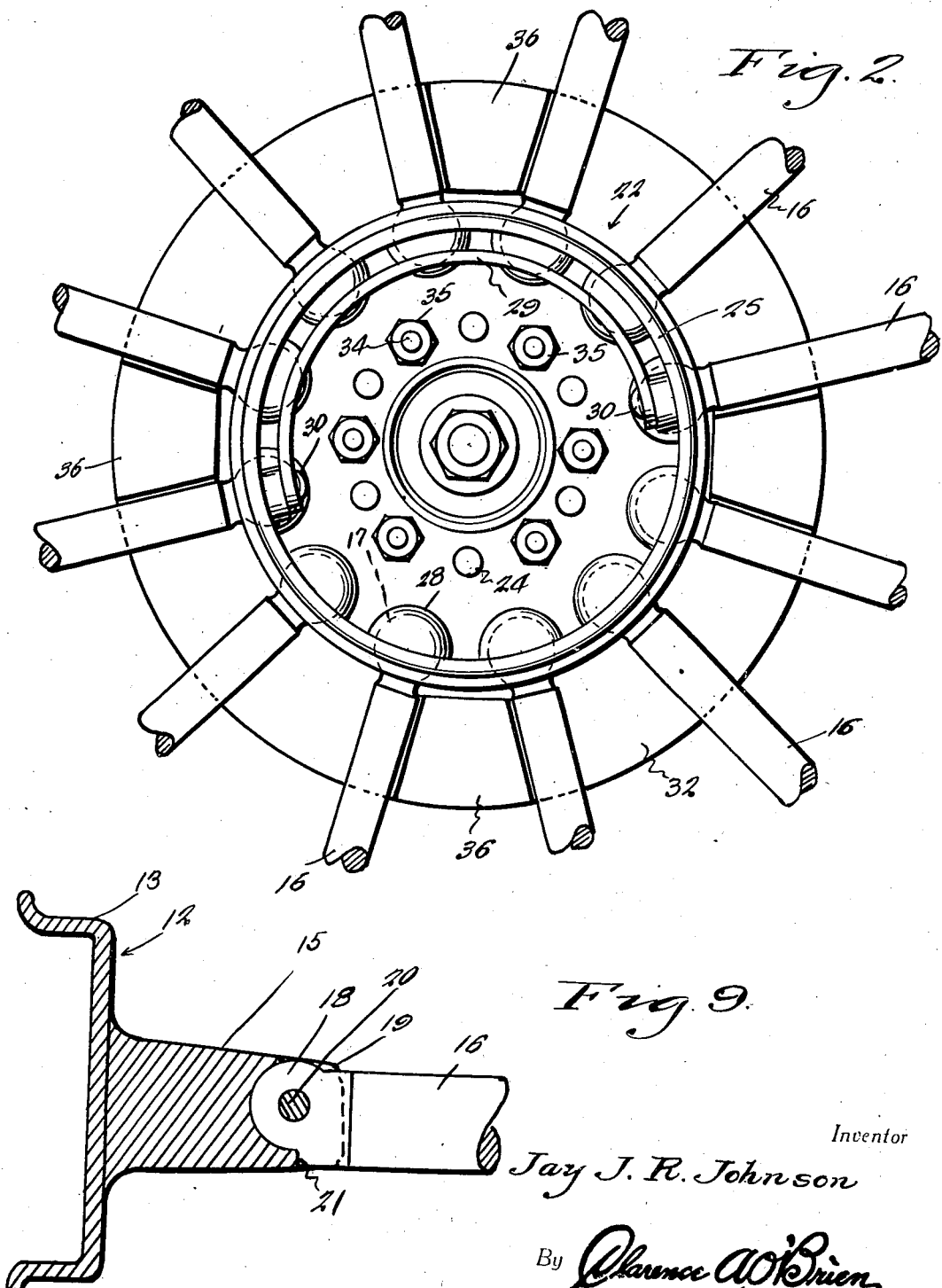

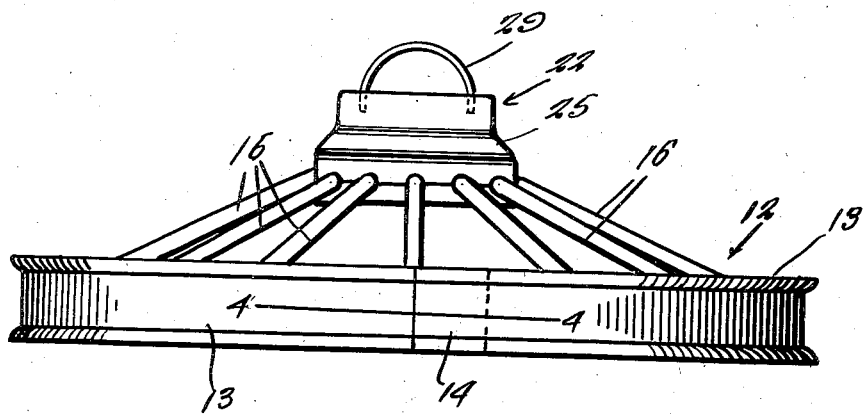
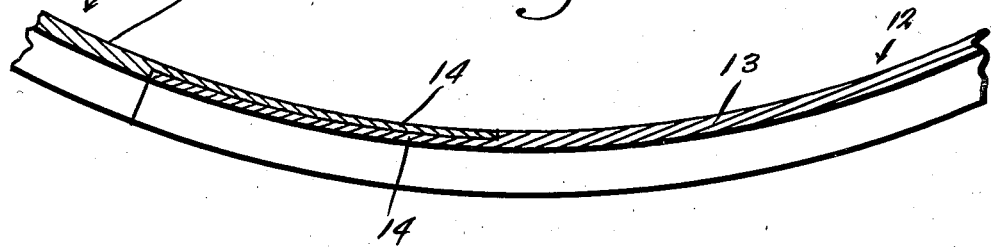
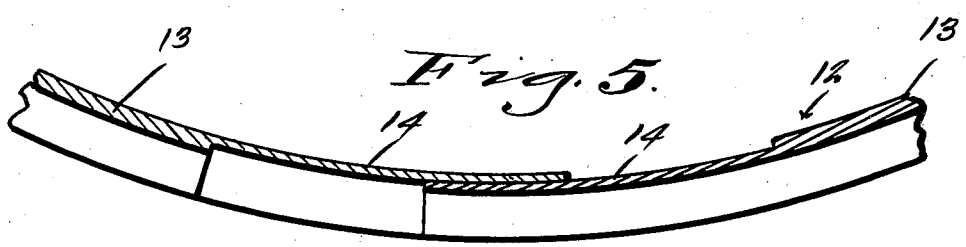

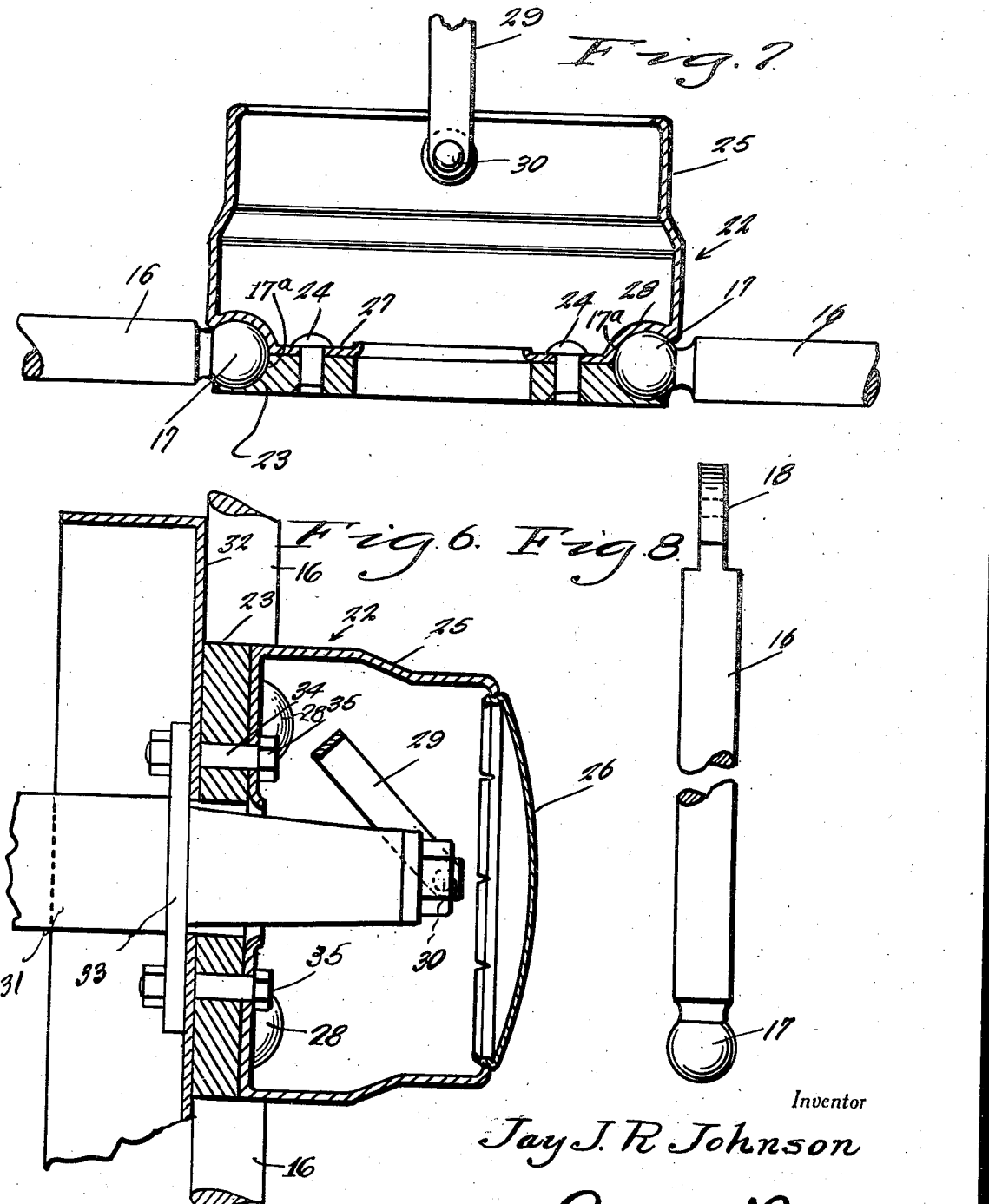

2,180,471

UNITED STATES PATENT OFFICE 2,180,471

COLLAPSIBLE VEHICLE WHEEL

Jay J. R. Johnson, Mumford, N. Y.

Application May 29, 1937, Serial No. 145,604

4 Claims. (Cl. 301—16)

The present invention relates to vehicle wheels, and in particular to a bodily detachable, expansible and contractible construction particularly devised to facilitate application and removal of a pneumatic tire.

My primary objective is to provide a wheel of the aforementioned collapsible type wherein the construction adopted to fulfill the requirements is in keeping with forthcoming demands of the trade advocating the adoption and use of a wheel which when detached from the vehicle may be expeditiously and conveniently handled to remove the damaged tire and quickly substitute a ready-to-use tire.

Looking toward the development of a feasible and practicable collapsible wheel construction, I have, after due deliberation and considerate foresight, found it expedient and satisfactory to adopt a simple circumferentially expansible and contractible tire rim whose coordinated companion sections are simultaneously actuated through the instrumentality of an ingenious axially projectible and retractible hub and spoke assembly.

Other features and advantages will become readily apparent from the following description and drawings.

In the drawings:

Figure 1 is what may be called an outside elevational view of the improved wheel as it appears when on the vehicle and including the pneumatic tire as a part thereof.

Figure 2 is an enlarged fragmentary elevational view of the nucleus forming the hub and multiple spoke assembly, the hub cap being removed for clearness of illustration.

Figure 3 is an elevational view showing the detachable wheel removed from the vehicle and the hub and spoke assembly collapsed to either apply or remove a tire.

Figure 4 is a horizontal fragmentary detail section, on an enlarged scale, the section being through the segmental or sectional rim on the line 4—4 of Figure 3.

Figure 5 is a view similar to Figure 4 showing how the rim sectors or segments appear when expanded to normal tire-carrying positions.

Figure 6 is an enlarged section taken approximately on the plane of the line 6—6 of Figure 1.

Figure 7 is a fragmentary horizontal section through the hub construction with the wheel removed from the brake drum.

Figure 8 is a detail view of one of the especially designed wheel spokes.

Figure 9 is an enlarged detail section on the line 9—9 of Figure 10.

Figure 10 is an elevational view of one of the rim segments.

Figure 11 is a horizontal section on the line 11—11 of Figure 1.

Each rim unit or segment is denoted by the numeral 12. Each of these sections is identical in construction, and a description of one will suffice for all. To begin with, the numeral 13 designates the arcuate rim section, this being of customary channel-shaped cross-sectional form and provided with a slip joint extension 14 for coaction with a corresponding extension on the next adjacent unit or section. The extensions of the respective sections come together in telescoping relationship, as brought out to advantage in Figures 4 and 5. This overlapping, telescoping joint arrangement allows the rim, as a complete annulus, to be circumferentially expanded and contracted to facilitate application and removal of the tire. The various rim sections are provided on their inner peripheries with lugs 15. The wheel spokes 16 are connected to the respective lugs 15.

Each spoke is of the construction seen in Figure 8, at which point it will be observed that the inner end of the spoke is provided with a ball jointing element or head 17. At the opposite end it is provided with a hinging extension 18. The extension 18 fits between furcations 19 on the adjacent lug, as shown in Figure 9. Here a suitable hinge pin or connection is provided as at 20. Then, too, in this arrangement I provide abutting shoulders 21 whereby to provide what may be called a one-way hinging or rule joint connection between the spokes and lug-equipped rim sections.

Coming now to the hub unit 22, it will be seen from Figures 6 and 7 that this comprises a stabilizing and adapter annulus or ring 23. Riveted or bolted to this, as at 24 is the shell 25 forming a housing and mounting for the removable hub cap 26. It is to be observed that the meeting faces of the shell 25 and the adapter ring or plate 23 are fashioned to provide sockets. That is to say, the metal of the flange 27 is indented as at 28, and these indentations coordinate with notches in the ring 23 to provide sockets 17a for the ball heads 17.

The numeral 29 designates a bail whose arm portions are pivotally anchored or attached as at 30 to the interior of the hub shell 25, as brought out to advantage in Figure 7. This provides a projectible and retractible handle which may be drawn out to position for use as seen in Figure 3 when the hub cap 26 is removed. Thus, assuming that the wheel is lying on the ground or a similar supporting surface, as indicated in Figure 3, it is evident that by catching hold of the projecting handle 29 and lifting upwardly on the hub unit 22, this swings the plurality of spokes 16 into a collapsed state. In so doing, the overlapped ends of the rim segments are contracted to restrict the diameter of the rim. When thus restricted, a tire can be removed or applied, as is evident. Then, by exerting weight on the handle 29 and shoving downwardly on the then inclined spokes, they are forced into a plane with the surrounding rim, at which time the overlapped ends of the rim segments are shifted into the expanded relationship depicted in Figure 5 of the drawings. This is the full expanded state of the rim which serves to hold the tire thereon. With the tire thus applied, the whole wheel may be slipped over the axle 31, as seen in Figure 6, and bolted tightly against the brake drum 32 and axle flange 33 in the usual way. The wheel is held in place by the studs 34 and removable retaining nuts 35. Consequently, in order to remove the wheel in the first place, the hub cap 26 is removed as is ordinarily done in present day wheel mountings. Then the nuts 35 are removed to release the whole wheel, after which it may be bodily lifted off to make an exchange of tires.

The gist of the invention resides, it is believed, in the provision of a sectional tire rim with the sections interconnected in sliding relationship, the axially projectible and retractible hub unit 22, and the spokes intervening between the hub unit and rim and having hinge connections at opposite ends with these respective parts. More specifically, however, it is desirous of having the one-way rule joint to provide the hinge connections at the outer ends of the spokes and to utilize self-adapting ball and socket connections between the inner ends of the spokes and the hub means 22.

It is obvious that when the wheel hub 23 is bolted on and against the axle flange 33 and the spokes 16 firmly abut the brake drum 32 (see Figs. 6 and 11), it is in all respects a regular rigid wheel. It only becomes a collapsible wheel when it is detached and bodily removed from the axle, as seen in Figure 3 of the drawings.

In practice I have found it advisable to utilize spacer and abutment elements 36, as seen in Figure 2, these being on the brake drum and intervening between predetermined sets of spokes. Since there are four rim sections and associated spoke groups, there are four of these abutments 36, these serving to prevent rocking of the spokes when the wheel is in use.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a vehicle wheel construction of the class described, an annular circumferentially expansible and contractible rim, an attaching and supporting hub bodily movable in an axial direction toward and from said rim, said hub including a ring-shaped plate and a shell provided with a ring-shaped axially inner end, means for connecting the said inner end of the shell with the ring-shaped plate, the axially inner end of the shell and the outer portion of the plate having circumferentially spaced depressions in their peripheral portions forming ball sockets, spokes having balls at their inner ends fitting in said sockets, hinge connections between the outer ends of the spokes and the rim and means for detachably connecting the hub to a brake drum.

2. In a vehicle wheel of the class described, a hub unit including an adapter ring detachably connectible with a wheel flange, a shell permanently secured to said adapter ring, the marginal portions of said shell and ring being fashioned to provide sockets, a plurality of spokes having ball heads fitted movably in said sockets, and a surrounding rim, the outer ends of said spokes being connected with said rim.

3. In combination with a brake drum, a hub composed of a ring-shaped plate and a shell, said shell having a ring-shaped axially inner end fastened to the axially outer face of the plate, the peripheral portions of adjacent parts of the shell and plate having circumferentially spaced depressions therein forming ball sockets, means for detachably connecting the hub to the drum, spokes having ball-shaped inner ends fitting in the sockets, a sectional rim, the ends of the sections telescoping, lugs connected with the inner circumference of the rim, rule joint hinges connecting the outer ends of the spokes with said lugs and projections on the drum fitting between certain pairs of spokes.

4. In combination with a brake drum, a hub composed of a ring-shaped plate and a shell, said shell having a ring-shaped axially inner end fastened to the axially outer face of the plate, the peripheral portions of adjacent parts of the shell and plate having circumferentially spaced depressions therein forming ball sockets, means for detachably connecting the hub to the drum, spokes having ball-shaped inner ends fitting in the sockets, a sectional rim, the ends of the sections telescoping, lugs connected with the inner circumference of the rim, rule joint hinges connecting the outer ends of the spokes with said lugs and projections on the drum fitting between certain pairs of spokes, and a ball normally located in the shell and having its ends pivoted to internal wall parts of the outer portion of the shell.

JAY J. R. JOHNSON.